United States Patent
Bevilacqua-Linn (10) Patent No.: US 9,356,827 B2
(45) Date of Patent: May 31, 2016

(54) DATA CENTER NODE MANAGEMENT

(71) Applicant: Michael Bevilacqua-Linn, Philadelphia, PA (US)

(72) Inventor: Michael Bevilacqua-Linn, Philadelphia, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 419 days.

(21) Appl. No.: 13/785,654

(22) Filed: Mar. 5, 2013

(65) Prior Publication Data

US 2014/0237095 A1    Aug. 21, 2014

Related U.S. Application Data

(60) Provisional application No. 61/766,052, filed on Feb. 18, 2013.

(51) Int. Cl.
| G06F 15/16 | (2006.01) |
| H04L 12/24 | (2006.01) |
| H04L 12/26 | (2006.01) |
| H04L 29/12 | (2006.01) |

(52) U.S. Cl.
CPC ............ *H04L 41/042* (2013.01); *H04L 41/069* (2013.01); *H04L 43/0817* (2013.01); *H04L 41/082* (2013.01); *H04L 61/2038* (2013.01)

(58) Field of Classification Search
CPC ..... H04L 12/42; H04L 9/3247; H04L 41/412; H04L 12/403; H04L 2209/56; H04L 2209/805
See application file for complete search history.

(56) References Cited

U.S. PATENT DOCUMENTS

| 6,122,664 | A  | * | 9/2000 | Boukobza et al. | ............ 709/224 |
| 6,557,069 | B1 | * | 4/2003 | Drehmel et al.  | ............ 710/307 |
| 8,203,983 | B2 | * | 6/2012 | Oksman          | ............ 370/311 |
| 2005/0055418 | A1 | * | 3/2005 | Blanc et al. | ................. 709/209 |

* cited by examiner

*Primary Examiner* — Djenane Bayard
(74) *Attorney, Agent, or Firm* — Banner & Witcoff, Ltd.

(57) ABSTRACT

A distributed computing system may allow multiple devices to distribute master node responsibilities. The various nodes in the system may be given unique, sequenced, node identifiers, and may periodically report their status to a central monitor or current master node. A comparison of the report time stamps and node identifiers, made against the node identifier of the current master node, may yield a determination as to whether the current master node should be replaced.

20 Claims, 6 Drawing Sheets

DATA CENTER NODE MANAGEMENT

CROSS-REFERENCE TO RELATED APPLICATIONS

The present application claims priority to U.S. Provisional Application Ser. No. 61/766,052, entitled "Data Center Node Management," and filed on Feb. 18, 2013, the contents of which are hereby incorporated by reference.

BACKGROUND

Data services are typically provided and consumed by a group of computing devices working together. For example, a data center supporting an Internet video streaming service may employ a variety of computing devices to respond to various user requests for content. Such services may designate one of the devices to be a "master node." A designated master node may be given additional responsibilities for managing the service, such as arbitrating conflicts and authorizing new devices. Unfortunately, there are situations where a master node can fail, and might not be able to report its failure to the other devices in the service. A failed master node can lead to undesired service disruption, and while failures can be mitigated to some extent, they cannot completely be avoided. Accordingly, there is a constant need for improved methods for managing master and other node failures in a distributed service system.

SUMMARY

The following summary is for illustrative purposes only, and is not intended to limit or constrain the detailed description.

In some embodiments, a plurality of nodes in a network or system may be assigned unique, sequential master node priority indications, such as node identifier (ID) values. The nodes may periodically report, or be polled to provide, their status to a central location such as the current master node, and the current master node may maintain a storage log of the received messages. The master node may also compare the master node priority value of the sending node with that of a subset of previous messages received over a predetermined time period, and determine whether a new master node should be selected.

In some embodiments, if the received message was sent by the master node itself, then the master node may determine whether the subset of previous messages include any messages from a node having a higher master node priority. If such a message was received, then the current master node may surrender its master node status to the sender of that message.

In some embodiments, if the received message was sent by a node other than the current master node, then the master node may determine whether all of the subset of previous messages were sent by nodes having a lower master node priority than the node that sent the received message. If they were, then the sender of the received message may be instructed to assume master node status.

In some embodiments, a master node term limit may be established, to limit an amount of consecutive time that a single node may serve as master node. If a master node exceeds the term limit, then a successor node may be selected from the subset of previous messages, by selecting a node (excluding the current master node) having the highest master node priority.

In some embodiments, each node in the system may be assigned a unique identifier, such as a monotonically increasing integer value, indicating that node's priority for becoming master node. Periodically, the nodes may report their active status to a central storage location, and retrieve a listing of the received reports from the central storage location. The nodes may each consult the listing to determine whether a higher-ranking node has reported in within a predetermined period of time prior to the current time. The predetermined period of time may be different for each of the higher-ranking nodes appearing in the list, such that the time used for lower-ranking nodes may already include time consumed by higher-ranking nodes.

As noted above, this summary is merely a summary of some of the features described herein. It is not exhaustive, and it is not to be a limitation on the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
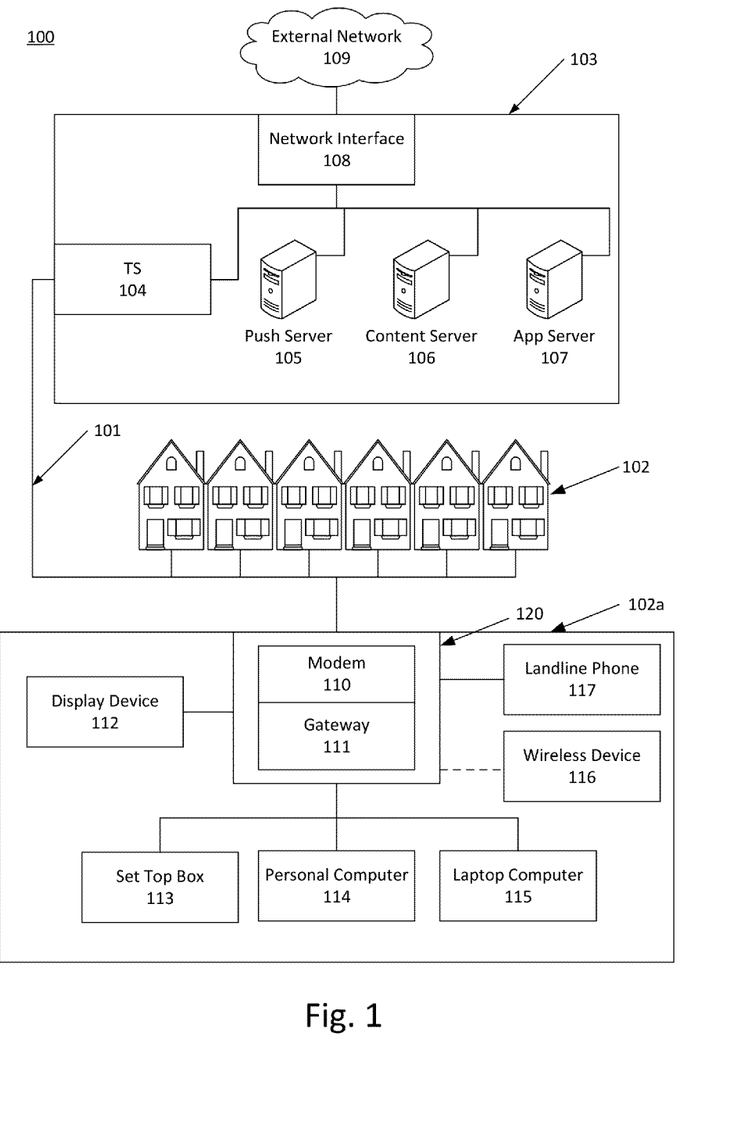
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs 112, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
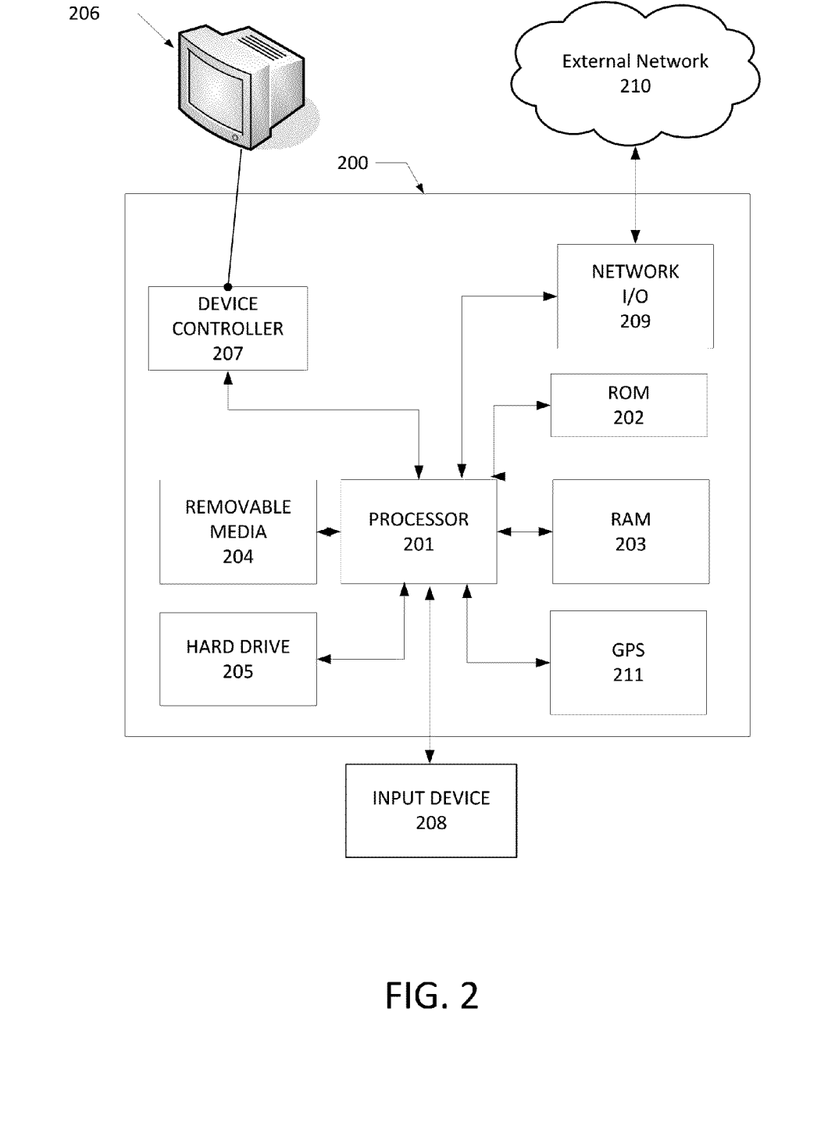
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3A:
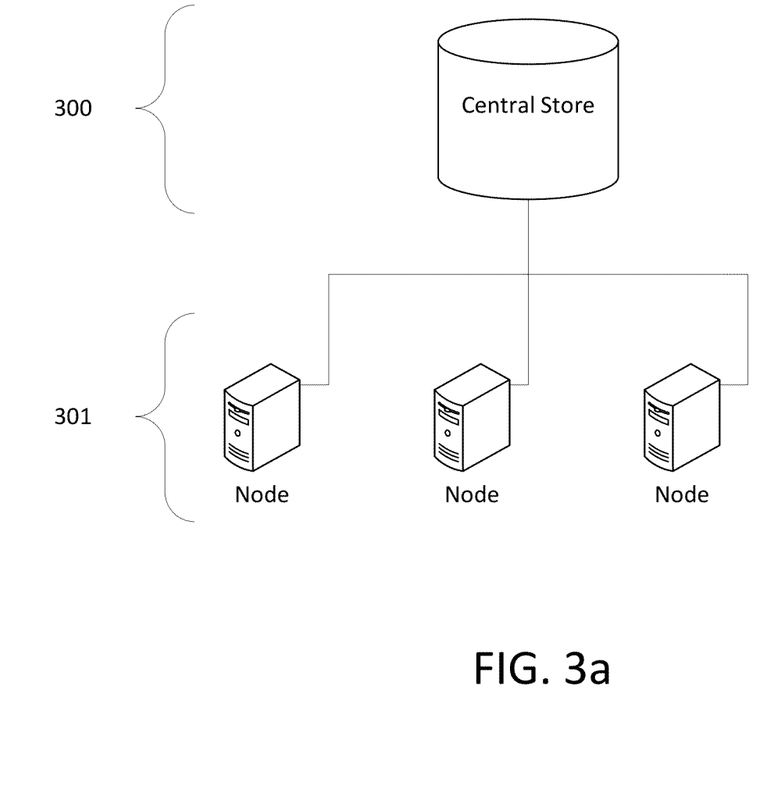
FIGS. 3*a* & *b* illustrate an example data center system.

FIG. 3a illustrates an example data center. As illustrated, a central data store 300 may store content, such as video on demand, movies, etc., that is made available for download and/or streaming to users. To handle the various requests and send requested content to users, the data center may employ multiple computing device nodes 301. Each node 301 may handle a subset of the user requests for content, or service a subset of users. In some embodiments, one of the nodes 301 may be designated as a master node for the data center, and may handle additional responsibilities, such as managing the load responsibilities of the various nodes.

Figure 3B:
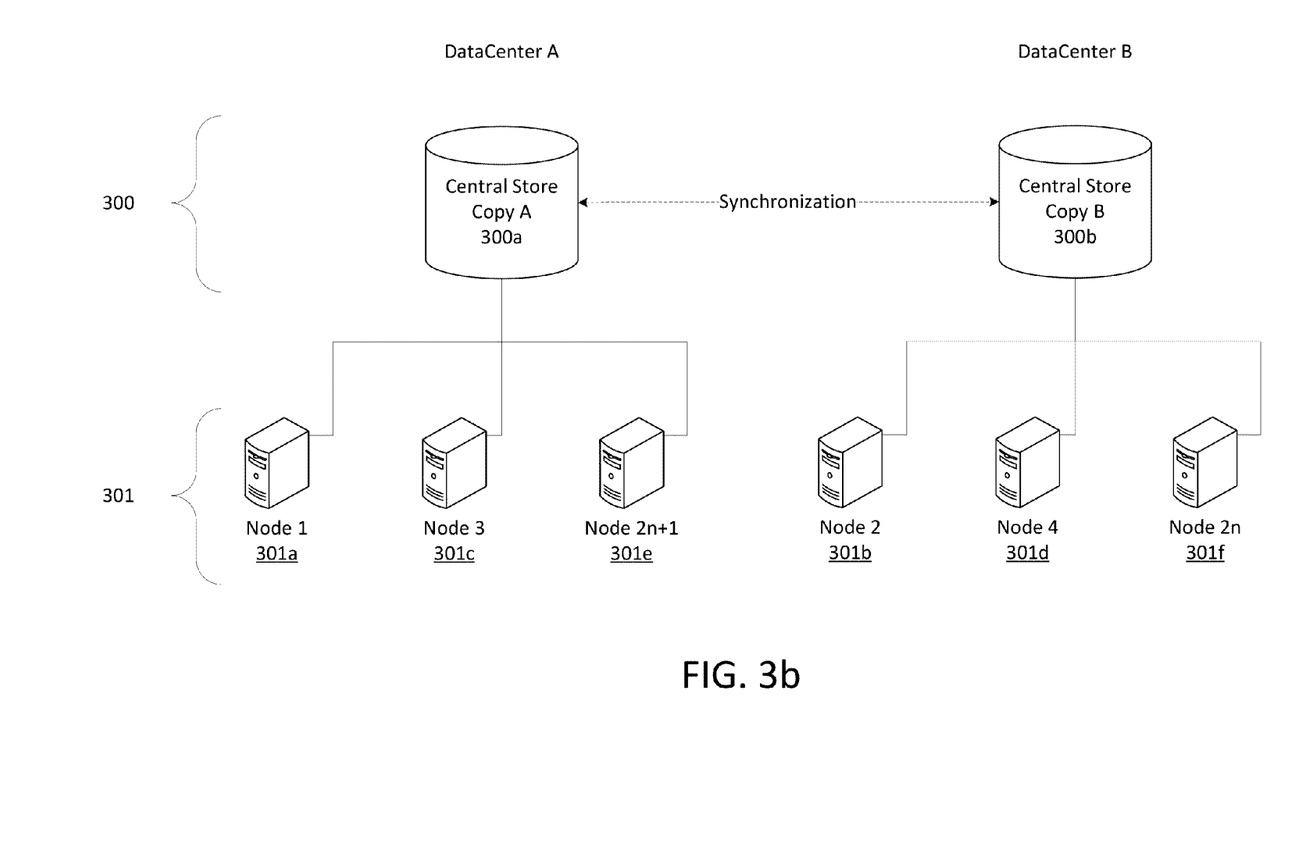

Although FIG. 3a shows a single data center, any single data center can become overwhelmed if a large enough number of users are to be serviced. So to address that, a variety of data centers may be used to offer the content. Each data center may include discrete management hardware and/or software for managing a group of clients for requests. The grouping can be done based on a variety of factors, such as geography, subscription level, user ID, etc. In some embodiments, the group of devices serviced by a datacenter may be based on data latency, where a datacenter group includes clients that are serviceable by a particular source device within a predetermined amount of latency or delay in signal transmission. For example, one data center may be located on the West coast of the United States, and service requests coming from that portion of the country, and another data center may be located on the East coast, servicing requests from that different portion of the country. FIG. 3b illustrates two data centers, Data Center A and Data Center B, each having a general architecture as illustrated in FIG. 3a. In particular, the data centers may have respective central storages 300a,b, which may store identical copies of the content that is made to the users across the country. Changes made to the content on one storage may be replicated to the other data center through a synchronization process. The two central stores 300a,b may be kept in synchronization, with periodic (e.g., every 10 seconds or minutes, every day or week, etc.) exchanges of updates that are made to the content. For example, if a system administrator updates a copy of a piece of content on the central store 300a for one Data Center A, then the synchronization message with central store 300b may help propagate that change to the Data Center B's users by central store 300a sending a synchronization message to central store 300b, the message containing the change.

The management responsibilities of a master node, however, might not scale equally with the servicing of user requests. For example, the two Data Centers A, B might not need to have two separate master nodes, if the processing load for performing the master node responsibilities is within a tolerable limit for the various nodes 301. In such systems, a single master node may be designated across the different data centers. In the FIG. 3b example, any of the nodes 301a-f may serve as the master node for all of the nodes illustrated, and regardless of the fact that some nodes are associated with a different Data Center. An example process of managing these master node assignments is described further below in FIG. 4, with reference to FIG. 3b.

Figure 4:
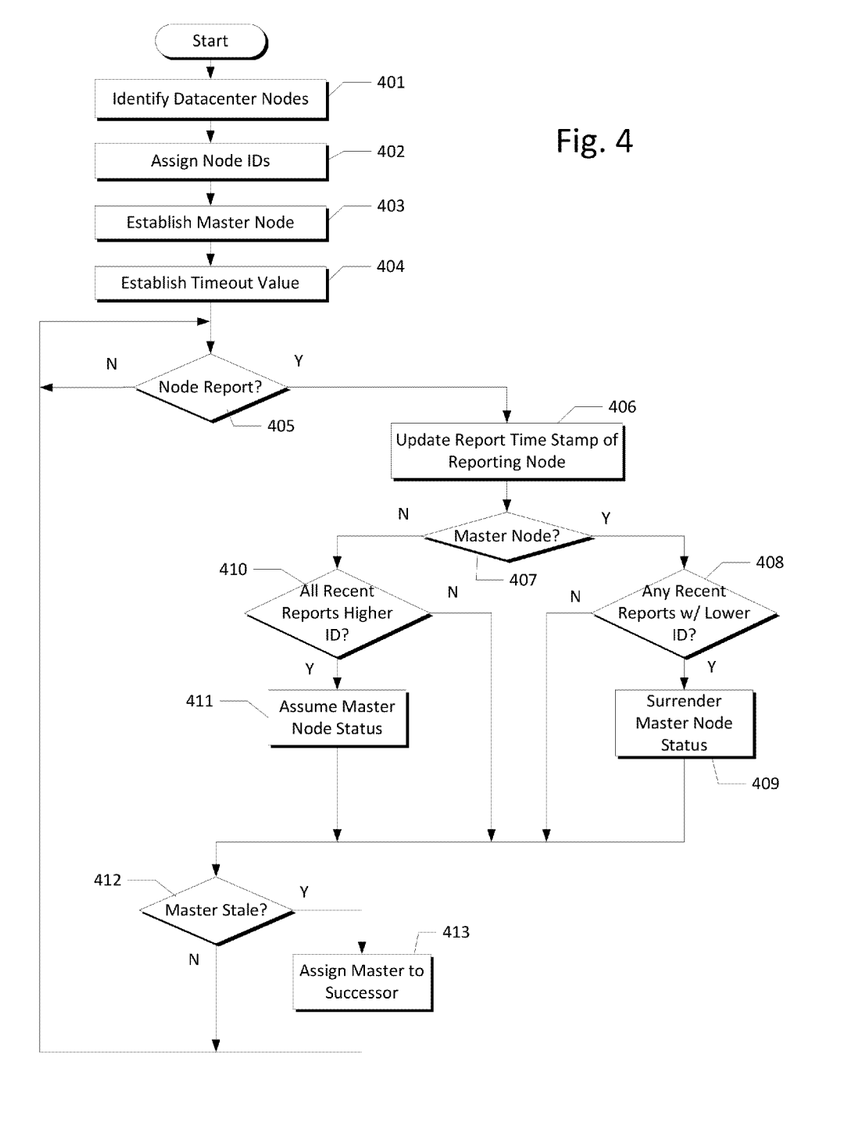
FIG. 4 illustrates an example process of managing nodes.

As illustrated in FIG. 4, the data center master node management process may begin in step 401 with the identification of the various nodes in the data center. Identifying nodes in a data center may be done manually, and may simply involve a system administrator identifying the various computing devices that will be serving as nodes to help receive and respond to requests for content offered by the data center. Although data center nodes are the example described herein, the nodes may be any node in a network.

In step 402, the identified nodes may then be assigned identifiers (IDs). Each ID may be unique across the various data centers that are in the system, and the IDs may be assigned in a monotonically increasing fashion across the nodes in the system. In some embodiments, the IDs may be integers that are assigned in an increasing order beginning with number 1. So as illustrated in FIG. 3b, the nodes 301a-f may be assigned IDs of 1-6, respectively. The increasing order may also signify decreasing (or increasing) priority for service as a master node (e.g., a lower ID number may be more preferred for service as a master node, as will be explained in greater detail below). The example embodiment described herein uses lower ID numbers to signify a greater priority in becoming master node, but any alternative numbering or priority designation scheme may be used. The node IDs need not even be numeric. For example, the IDs may be expressed as alphabetical letters or words, with priority based on the alphabetic sequence. The assignment of IDs to nodes may be done arbitrarily, if the nodes are all considered equally fungible and capable of assuming master node status. In alternative embodiments, the assignment of IDs may be made based on differences in capability, such that a node having the best capacity for serving as master is given the highest rank (e.g., node 1), with remaining nodes assigned numbers in order of decreasing capability of handling the master node responsibilities. Node 2 may be the second-best at being master, node 3 the third best, and so forth.

In the illustrated example, the nodes are numbered in an alternating fashion between two data centers. The odd-numbered nodes are from data center A, while the even-numbered nodes are from data center B. This is just an example, and any desired numbering scheme may be used with any desired number of data centers.

In step 403, an initial master node may be defined. The initial master node, in some embodiments, may simply be the node having the lowest numeric ID number. In the illustrated example, node 301*a* would have the lowest number (number 1), and would be selected as the initial master node. The master node's responsibilities may include allocating processing load across the other nodes in the system, as well as any other responsibility, which can vary depending on the application. For example, a system that services Internet page requests may employ a master node to authenticate and approve user requests for content, and handle recordkeeping and billing responsibilities. A video streaming service may have its master node responsible for receiving and handling user requests for content, initiating and tearing down streams to deliver requested content, and to process new incoming videos and uploads. A distributed video game system may use the master node to keep the current state information for the various players of the game, and perform central scorekeeping and synchronization functions. Establishing a node as the master node may involve loading the selected node with software needed to cause it, upon execution, to perform the additional responsibilities of a master node. In some embodiments, however, the software may already be loaded on all of the nodes, and may simply be activated upon accepting the master node responsibilities.

As a part of establishing the master node, a term limit may also be established. The term limit may be a time period (e.g., 2 days) that is the most amount of contiguous time that a node will be permitted to serve as master. Setting a term limit may be done during system initialization, and having a limit may help evenly distribute the burden of serving as a master node.

In step 404, a timeout value may be established for the various nodes to report in that they remain active. As will be described below, the master node management process may include a master node periodically polling the nodes to request confirmation that they remain active. As an alternative to polling, the nodes themselves may be configured to periodically transmit a message to the current master node, informing the master node that the reporting node remains active. The message, either in response to a poll inquiry or automatically transmitted, may include information identifying the reporting node (e.g., its node ID) and a time stamp indicating the time of the message (although the time stamp can also be omitted, if the central store 300 is configured to mark the message with the time of receipt when updating the node reporting database). A timeout value may be used to determine when a master node has become inactive. For example, if a master node fails to report that it is active for a timeout period of ten seconds, then the other nodes in the system may assume that the master node has become inactive, and may take steps to find a new master node. The actual value for the timeout period can depend on the type of application, and the tolerance that application has for delays in response if the master node goes down.

In step 405, the various node reports may be received by the current master node. The reports, or by another centralized computing device. The reports may be automatically sent by the nodes (e.g., according to a predetermined schedule implemented at the nodes), or they may be sent by the nodes in response to a polling request from the current master node. In a polling embodiment, the master node (or central storage 300) may periodically transmit requests to the various nodes in the system, asking the nodes to report their current status.

If no node report is received, then the master node management process may simply remain at step 405 until a report is received. In some embodiments, the process may be interrupted to update configuration files and for other reasons, but for simplicity in description, the FIG. 4 example illustrates the master node management process awaiting a report. If a node report is received, then in step 406, the current master node may update a node reporting database to add an entry identifying the reporting node, and the time at which the report was received. The node reporting database may be stored by the current master node in a memory, such as hard drive 205, within the current master node, or at one of the central stores 300*a,b*. An example node reporting database may be as follows:

| Node ID | Report Time |
| --- | --- |
| 1 | Nov. 1, 2012 00:02:32 |
| 2 | Nov. 1, 2012 00:02:35 |
| 1 | Nov. 1, 2012 00:02:37 |
| 7 | Nov. 1, 2012 00:02:37 |
| 3 | Nov. 1, 2012 00:02:40 |
| 5 | Nov. 1, 2012 00:02:44 |
| 8 | Nov. 1, 2012 00:02:45 |
| 2 | Nov. 1, 2012 00:02:45 |
| 1 | Nov. 1, 2012 00:02:48 |

In step 407, the current master node may determine whether the received node report was received from itself—the current master node. Such internal reports may be logged along with reports from other nodes, and may be treated differently as described below.

If the received report is from the current master node, then in step 408, then the current master node may consult the node reporting database to retrieve the node reports that have been received recently (e.g., within the predetermined timeout period discussed above), and to determine whether any of those reports were received from nodes having a lower node ID than the current master node. If a recent node report was received from a node having a lower node ID, then in step 409, the current master node may take steps to surrender its master node status, in favor of the node that had the lower node ID and recent node report. If there were multiple such nodes (e.g., multiple lower-numbered nodes had reported within the timeout period), then the current master node may select the one of those nodes with the lowest node ID.

Surrendering the master node status may include exchanging messages with the new master node, to inform the new master node of the transfer of responsibility. The messages may also provide the new master node with a copy of the node reporting database maintained by the previous master node. Surrendering the master node status may also include sending messages to the other nodes in the system, informing them of the update, and requesting that they direct future status messages to the new master node. In alternative embodiments, a single constant address may be used for sending those reports, and a computing device at that address may redirect the node reports to the current master node. In such alternative embodiments, it may not be necessary to transmit messages to all nodes of the master node status change, and instead the redirecting computing device (which may itself be one of the nodes in the system) may be the only device that needs to be informed of the change.

After surrendering the master node status, the process may proceed to step 412. However, in step 407, if the received report did not come from the master node, then in step 410, the current master node can retrieve the node reporting database and determine whether all of the recent logged reports (e.g., the reports that were received within the timeout period from the current time) were received from nodes that had higher IDs and, therefore, a lower rank in the ranking of nodes for master node status. If all were received from nodes with higher IDs, then the reporting node that sent the received report will assume master node status in step 411. Assuming master node status may entail the same types of exchanges of information discussed above regarding the surrendering of master node status, to transfer master node designation. Although in this case, the master node designation is being taken away from the current master node, and given to the node that sent the received node report.

However, in step 407, if at least one of the recent reports came from a node that had a lower ID value than the node that sent the received node report, then it may be assumed that the other lower ID node took over as master node, and that the node that sent the received report need not assume those responsibilities. In that case, the process may proceed to step 412.

In step 412, the master node may determine whether it has served as master node for longer than a predetermined term limit (which may be established during configuration, or in step 403. If it has exceeded the term limit, then in step 413, the master node may identify a successor node and relinquish master node status to the successor node. Identifying the successor node may involve consulting the node reporting database to identify the various nodes that have reported within the timeout period, and identifying the lowest-numbered reporting node (disregarding the reports from the current master node).

Figure 5:
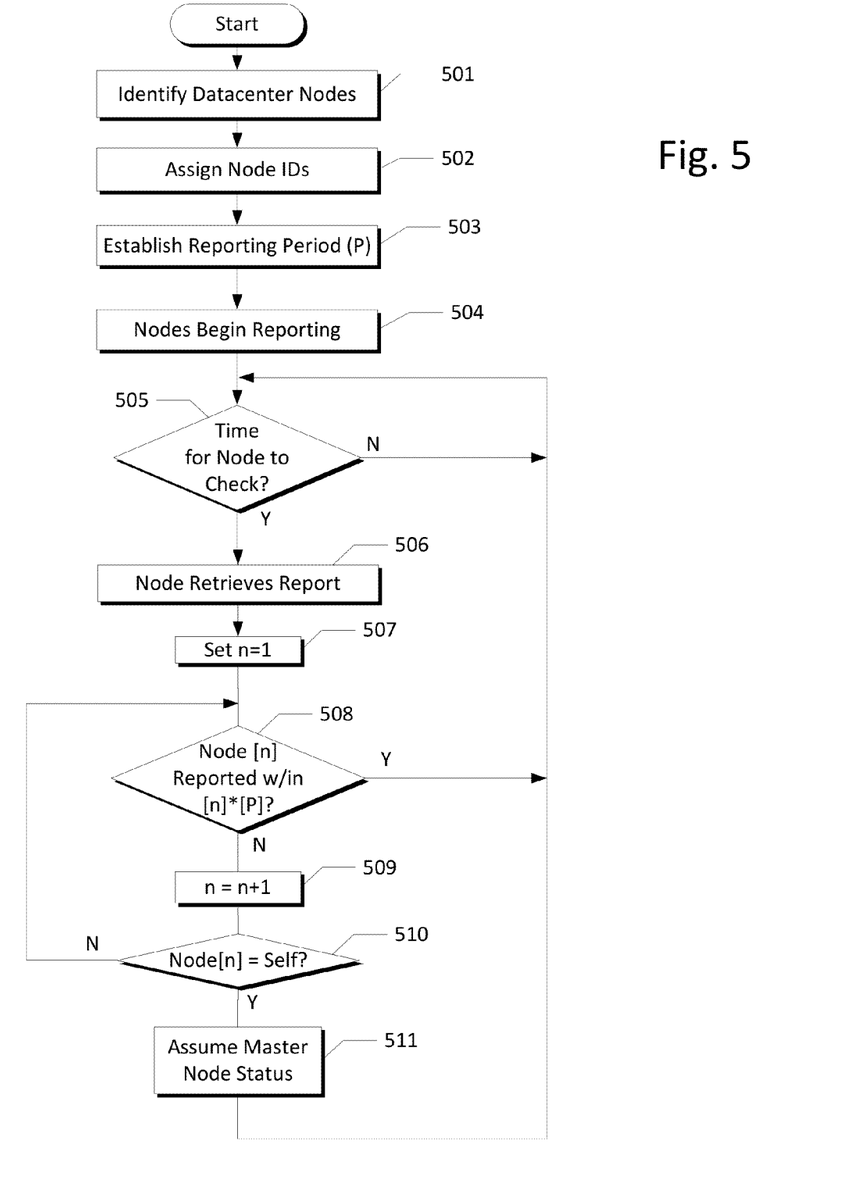
FIG. 5 illustrates another example process of managing nodes.

FIG. 5 illustrates an alternative embodiment process of master node management. The process steps themselves may be performed by a node management computing device, similar to the FIG. 4 process, and parts of the process may be performed by the various computing device nodes in the system. In this alternative embodiment, the process may begin with an identification of the various nodes 501, which may be the same as described above in step 401. Similarly, step 502 may be the same as step 402, and may involve an assignment of node IDs to the various nodes identified in step 501. As before, the node IDs may be in a monotonically increasing value (e.g., integers), with each node being assigned a sequential and unique value. These node IDs may be considered as rankings, with the ranking of 1 being the highest rank.

In step 503, the node management computing device may establish a reporting period (P). The reporting period may be a predetermined period of time during which a current master node is expected to report in to the central store 300. For example, a video content delivery network may expect its master nodes to report in once every 5 seconds, to help ensure that incoming orders are processed with minimal delay. In step 504, the various nodes begin their operation, and they each begin reporting in to the central store 300 at the time period P. There may be some flexibility, and delay, in the network such that the various reports may arrive at the central store 300 in a staggered fashion, in contrast to having all nodes report in simultaneously.

In step 505, a loop may begin executing on each of the nodes. In step 505, each executing node may determine whether it is time for that node to check on the master node status. The executing nodes may make this determination based on a variety of factors. For example, nodes may be configured to automatically check on the master node status every 10 minutes. Alternatively, the nodes may be configured to check on the master node status in response to other conditions, such as the execution of a predetermined command (e.g., a master node refresh command supplied by a user or another system), or the receipt of a predetermined number of customer requests (e.g., every 100 requests for video streams), or if a current request goes unanswered for more than a predetermined amount of time (e.g., 4 minutes). In some embodiments, the nodes perform this check every time they report in to the central store 300.

If it is not time to check, then this process may simply remain at step 505. However, if it is time to check, then in step 506, the executing node may transmit a request to the central store 300 for a current copy of the central store's node reporting database, and may receive a copy of the node reporting database in response. To conserve bandwidth, the node reporting database may only retain a predetermined maximum number of entries, such as the last 100 reports, or reports received in the last 30 minutes. In some embodiments, this report duration may be based on the time period (P), such as ten times P.

In step 507, the node may being a loop to step through the reports found in the node reporting database, starting with a node count value (n) set to one. In step 508, the executing node may determine whether the ranking node having the rank of (n) in the node reporting database has reported in within a time value $(t)=(n)*(P)$ amount of time. For example, for the first pass through, n is set to one, and the determination in step 508 will be to determine whether the highest ranking node (node ID of 1) has reported in within 1*P amount of time (e.g., 1×10 seconds=within 10 seconds) prior to the current time. By multiplying the ranking node's rank by the time period P, this approach allows additional time for a higher-ranking node to report in. For example, the $3^{rd}$-ranked node would not assume master node status unless both the $1^{st}$ and $2^{nd}$-ranked nodes were delinquent, but the time period P for the $2^{nd}$-ranked node would include time after the $1^{st}$-ranked node's time ran out.

If the ranking node has reported in within the calculated time, then the process may return to step 505, since it can be assumed that a node ranked higher than the executing node is active and serving as the master node. If the ranking node has not reported in within the calculated time, then in step 509 the value of n may be increased by one. In step 510, the executing node may then determine whether it is the node having the rank of n. If that is the case, then the executing node will have determined that none of the higher ranking nodes have reported in a timely fashion, and that the executing node should assume the master node responsibilities. In this situation, the executing node may proceed to step 511, and assume the master node status. Assuming the master node status may involve the same steps and features described above regarding step 411.

If, in step 509, the executing node is not at the rank of n, then it may return to step 508, and perform another calculation to determine if the node at the rank of n has reported in within a time period of n times P (e.g., 20 seconds if n is 2 and P is 10 seconds). This process may repeat itself until the executing node finds a higher-ranking node that reported in timely, or the executing node determines that it is the highest-ranking active node (in which case the executing node may assume the master node status).

Note that with the algorithm in FIG. 5, if a lower-ranking node assumes master node status, it may be called upon to surrender that status if a higher-ranking node reports in and conducts the same process steps.

In the FIG. 5 example, the nodes may check to update the master node each time the executing nodes transmit a status report to the central store 300. In alternative embodiments, the nodes may transmit their status reports to all of the other nodes in the system, and those other nodes can simply determine whether the current reporting node would make a better master node than the current master node. This can be done, for example, by determining if the current master node has a lower ID (higher rank) than the current master node, or if the current master node has not reported its status within the timeout period (e.g., within the last 10 seconds). Such an alternative embodiment may simplify the central store 300, as it may instead reside at the various nodes, and may simply store a single entry—the entry having the time stamp and ID of the current master node's last reporting message. This may obviate the need for a single central store 300, but it increases the amount of communication traffic.

In an alternative embodiment, the central store may simply store the status report information for the current master node. Each node may be responsible for reporting its status, and if any node sees that the current master node has not reported in within the time period (P), then that node may claim the master node status and report this to the central store and/or the other nodes in the system.

Although example embodiments are described above, the various features and steps may be combined, divided, omitted, and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

I claim:

1. A method comprising:
    establishing, by one or more processing devices, a master node term limit for a current master node;
    receiving, by the one or more processing devices, a plurality of node reporting messages from a plurality of nodes including the current master node;
    storing, by the one or more processing devices, and for each of the node reporting messages, node reporting information indicating a node that sent the node reporting message, and a time stamp for the node reporting message;
    determining, by the one or more processing devices, a subset of the received plurality of node reporting messages that were received within a predetermined timeout period; and
    responsive to a determination, by the one or more processing devices, that the current master node has exceeded the master node term limit, selecting, by the one or more processing devices, a new master node based on a comparison of master node priority indications for nodes sending the subset of the received plurality of node reporting messages.

2. The method of claim 1 further comprising, prior to the determination that the current master node has exceeded the master node term limit:
    receiving, from a first node, a new node reporting message; and
    determining that the first node is the current master node, and in response, determining whether the subset of the received plurality of node reporting messages includes any messages from a node having a higher master node priority indication than that of the first node.

3. The method of claim 2, further comprising, in response to determining that the subset includes at least one message sent from a node having a higher master node priority indication than that of the first node, reassigning master node status from the first node to the node that sent the at least one message.

4. The method of claim 1, further comprising assigning unique, sequential node identifiers to the plurality of nodes.

5. The method of claim 4, wherein a lower numeric node identifier is a higher master node priority indication.

6. The method of claim 1, further comprising, prior to the determination that the current master node has exceeded the master node term limit:
    receiving, from a first node, a new node reporting message; and
    determining that the first node is not the current master node, and in response, determining whether the subset of the received plurality of node reporting messages were all sent by nodes having a lower master node priority indication than that of the first node.

7. The method of claim 1, wherein the selecting the new master node further comprises selecting a node corresponding to a highest master node priority ranking as the new master node.

8. The method of claim 1, wherein the master node term limit is a predetermined time period representing a maximum amount of contiguous time that a node will be permitted to serve as a master node.

9. A method comprising:
    receiving, at a first computing device, information indicating times at which other computing devices provided status messages, and a unique node identifier (n) for each of the other computing devices;
    for each of the other computing devices:
        determining the unique node identifier (n) for that other computing device;
        calculating a time value (t) that is the determined unique node identifier (n) for that other computing device multiplied by a time period (P); and
        ascertaining whether that other computing device provided a status report within the time value (t) prior to a current time; and
    determining whether the first computing device should assume master node status over the other computing devices based on results of the calculating and ascertaining for each of the other computing devices indicated in the information.

10. The method of claim 9, further comprising assigning unique node identifiers (n) to the other computing devices using monotonically increasing integers.

11. The method of claim 9, further comprising limiting the calculating and ascertaining to those other computing devices having a node identifier (n) that is lower than a node identifier of the first computing device.

12. The method of claim 9, further comprising stopping the calculating and ascertaining when another computing device is determined to have reported its status within its corresponding value of time of (t) prior to the current time.

13. A computing device, comprising:
- a processor; and
- a computer-readable medium, storing instructions that, when executed by the processor, cause the computing device to perform the following:
  - establish a master node term limit for a current master node;
  - receive a plurality of node reporting messages from a plurality of nodes including the current master node;
  - store, for each of the node reporting messages, node reporting information indicating a node that sent the node reporting message, and a time stamp for the node reporting message;
  - determine a subset of the received plurality of node reporting messages that were received within a predetermined timeout period; and
  - responsive to a determination that the current master node has exceeded the master node term limit, selecting a new master node based on a comparison of master node priority indications for nodes sending the subset of the received plurality of node reporting messages.

14. The computing device of claim 13 wherein the computer-readable medium further stores instructions that, when executed by the processor, further cause the computing device to, prior to the determining that the current master node has exceeded the master node term limit:
- receive, from a first node, a new node reporting message; and
- determine that the first node is the current master node, and in response, determining whether the subset of the received plurality of node reporting messages includes any messages from a node having a higher master node priority indication than that of the first node.

15. The computing device of claim 14, wherein the computer-readable medium further stores instructions that, when executed by the processor, further cause the computing device to:
- determine that the subset of the received plurality of node reporting messages includes a message from a node having a higher master node priority indication than that of the first node; and
- reassign master node status from the first node to the node.

16. The computing device of claim 13, wherein the computer-readable medium further stores instructions that, when executed by the processor, further cause the computing device to assign unique, sequential node identifiers to the plurality of nodes.

17. The computing device of claim 16, wherein a lower numeric node identifier is a higher master node priority indication.

18. The computing device of claim 13, wherein the master node term limit is a predetermined time period representing a maximum amount of contiguous time that a node will be permitted to serve as a master node.

19. The computing device of claim 13, wherein selecting the new master node further comprises selecting a node corresponding to a highest master node priority ranking as the new master node.

20. The computing device of claim 13, wherein the computer-readable medium further stores instructions that, when executed by the processor, further cause the computing device to, prior to the determining that the current master node has exceeded the master node term limit:
- receive, from a first node, a new node reporting message; and
- determine that the first node is not the current master node, and in response, determine whether the subset of the received plurality of node reporting messages were all sent by nodes having a lower master node priority indication than that of the first node.

* * * * *